United States Patent
Yanke et al.

(12)

(10) Patent No.: US 12,048,269 B2
(45) Date of Patent: *Jul. 30, 2024

(54) SUSPENSION COMPLIANCE TO REDUCE FRAME LOADING

(71) Applicant: Deere & Company, Moline, IL (US)

(72) Inventors: Bryan R. Yanke, Eldridge, IA (US);
Duane M. Bomleny, Geneseo, IL (US);
Andrew J. Braet, Moline, IL (US);
Michael L. Vandeven, Princeton, IA (US); Paul D. Marvin, DeWitt, IA (US)

(73) Assignee: DEERE & COMPANY, Moline, IL (US)

(*) Notice: Subject to any disclaimer, the term of this patent is extended or adjusted under 35 U.S.C. 154(b) by 134 days.

This patent is subject to a terminal disclaimer.

(21) Appl. No.: 17/686,189

(22) Filed: Mar. 3, 2022

(65) Prior Publication Data

US 2022/0192089 A1    Jun. 23, 2022

Related U.S. Application Data

(63) Continuation of application No. 16/414,573, filed on May 16, 2019, now Pat. No. 11,297,765.
(Continued)

(51) Int. Cl.
*A01D 34/66* (2006.01)
*A01B 61/04* (2006.01)
(Continued)

(52) U.S. Cl.
CPC .......... *A01D 34/661* (2013.01); *A01B 61/044* (2013.01); *A01D 41/141* (2013.01);
(Continued)

(58) Field of Classification Search
CPC ... A01B 61/044; A01B 63/10; A01B 63/1013; A01B 73/005; A01C 7/06; A01C 7/208;
(Continued)

(56) References Cited

U.S. PATENT DOCUMENTS 2,690,040 A * 9/1954 Miller ................. A01D 34/661
56/6
3,468,107 A * 9/1969 Van Der Lely ...... A01D 41/144
56/16.2
(Continued)

FOREIGN PATENT DOCUMENTS

EP         2 248 408 B1    11/2010

*Primary Examiner* — Arpad Fabian-Kovacs
(74) *Attorney, Agent, or Firm* — Taft Stettinius & Hollister LLP; Stephen F. Rost

(57) ABSTRACT

A harvesting system includes a header pivotally attached to a combine. The header includes a center section to which a left wing and right wing are pivotally attached. A suspension system of the harvesting system includes first and second engageable states that enable dynamic wing behavior and reduce structural load. The first state corresponds to a harvesting configuration of the header in which the wings are allowed to pivot to allow the header to follow changes in terrain. The second state corresponds to a configuration in which the header is elevated relative to the ground. In the second state, the ability of the wings to pivot is minimized as compared to the first state, which allows the header to be maintained in a substantially flat configuration while minimizing the amount of dynamic load imparted by the header on the combine during non-harvesting transport of the header.

20 Claims, 10 Drawing Sheets

Related U.S. Application Data

(60) Provisional application No. 62/693,278, filed on Jul. 2, 2018.

(51) Int. Cl.
    *A01D 41/14*      (2006.01)
    *A01B 63/10*      (2006.01)
    *A01B 73/00*      (2006.01)
    *A01C 7/06*      (2006.01)
    *A01C 7/20*      (2006.01)
    *F15B 13/04*      (2006.01)

(52) U.S. Cl.
CPC ........... *A01B 63/10* (2013.01); *A01B 63/1013* (2013.01); *A01B 73/005* (2013.01); *A01C 7/06* (2013.01); *A01C 7/208* (2013.01); *A01D 41/145* (2013.01); *F15B 13/0401* (2013.01); *F15B 13/0405* (2013.01); *F15B 2013/0409* (2013.01); *F15B 13/0416* (2013.01)

(58) Field of Classification Search
CPC .. A01D 34/661; A01D 41/141; A01D 41/144; A01D 41/145; F15B 13/0401; F15B 13/0405; F15B 13/0416; F15B 2013/0409

See application file for complete search history.

(56) References Cited

U.S. PATENT DOCUMENTS

| | | | | |
|---|---|---|---|---|
| 3,683,601 | A * | 8/1972 | Van der Lely | A01D 34/13 56/6 |
| 4,409,780 | A * | 10/1983 | Beougher | A01B 73/02 56/228 |
| 4,487,004 | A * | 12/1984 | Kejr | A01D 41/14 56/297 |
| 5,427,182 | A | 6/1995 | Winter | |
| 6,128,892 | A * | 10/2000 | Neuerburg | A01D 34/661 56/15.8 |
| 6,606,956 | B1 | 8/2003 | Paluch | |
| 7,168,226 | B2 * | 1/2007 | McLean | A01D 41/141 56/10.2 E |
| 7,467,506 | B2 | 12/2008 | Lovett et al. | |
| 8,401,745 | B2 | 3/2013 | Otto et al. | |
| 8,635,842 | B2 | 1/2014 | Markt | |
| 8,919,086 | B2 * | 12/2014 | Markt | A01D 45/021 56/14.5 |
| 9,144,199 | B2 * | 9/2015 | Ritter | A01D 75/182 |
| 9,198,349 | B2 | 12/2015 | Ritter et al. | |
| 9,968,033 | B2 | 5/2018 | Dunn et al. | |
| 10,143,136 | B2 * | 12/2018 | Sudhues | A01D 57/20 |
| 10,433,486 | B2 | 10/2019 | Vandeven et al. | |
| 10,568,266 | B2 * | 2/2020 | Vandeven | A01D 41/145 |
| 10,617,059 | B2 | 4/2020 | Dunn et al. | |
| 10,681,865 | B2 | 6/2020 | Dunn et al. | |
| 10,765,066 | B2 * | 9/2020 | Schulze Selting | A01D 41/145 |
| 10,820,511 | B2 * | 11/2020 | Brimeyer | A01B 63/10 |
| 11,019,770 | B2 | 6/2021 | Brimeyer et al. | |
| 11,212,963 | B2 * | 1/2022 | Hunt | A01D 41/144 |
| 11,399,464 | B2 * | 8/2022 | Kraus | F15B 1/02 |
| 11,412,661 | B2 * | 8/2022 | Hunt | A01D 41/144 |
| 2003/0164125 | A1 | 9/2003 | Paluch et al. | |
| 2008/0072560 | A1 * | 3/2008 | Talbot | A01D 41/14 56/208 |
| 2014/0075909 | A1 * | 3/2014 | Bomleny | A01D 41/144 56/119 |
| 2015/0013795 | A1 * | 1/2015 | Ritter | A01D 41/145 137/596.16 |
| 2018/0371719 | A1 | 12/2018 | Marvin et al. | |
| 2019/0053429 | A1 * | 2/2019 | Cook | A01D 41/127 |
| 2019/0110404 | A1 | 4/2019 | Vandeven et al. | |
| 2020/0008338 | A1 | 1/2020 | Brimeyer et al. | |
| 2020/0008354 | A1 | 1/2020 | Brimeyer et al. | |
| 2021/0105930 | A1 | 4/2021 | Sivinski | |
| 2021/0289703 | A1 * | 9/2021 | Hunt | A01D 41/141 |

* cited by examiner

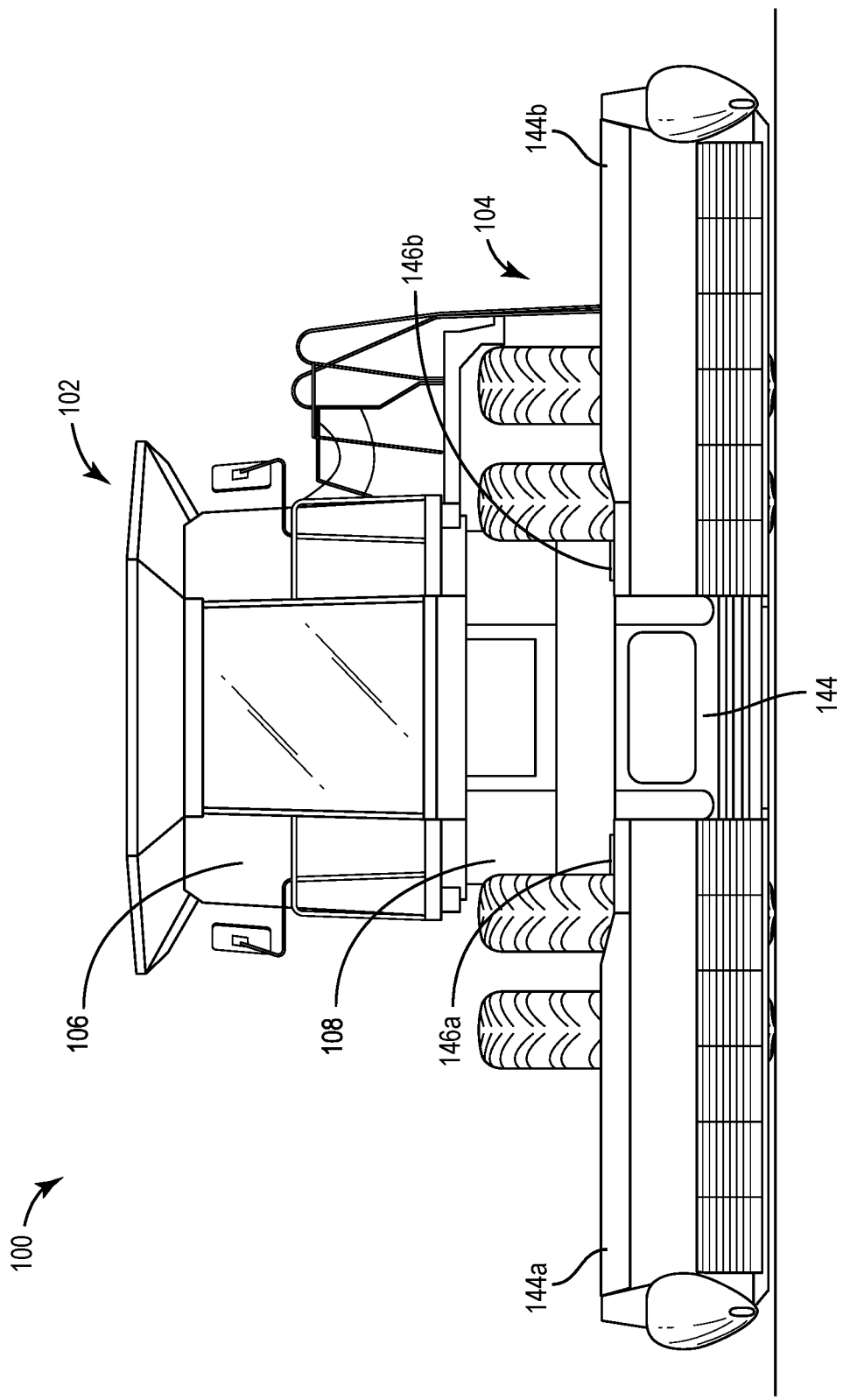

SUSPENSION COMPLIANCE TO REDUCE FRAME LOADING

CROSS-REFERENCE TO RELATED PATENT APPLICATIONS

This application is a continuation of U.S. application Ser. No. 16/414,573, filed May 16, 2019, which claims the benefit and priority under 35 U.S.C. § 119(e) to U.S. Provisional Application No. 62/693,278, titled "SUSPENSION COMPLIANCE TO REDUCE FRAME LOADING," filed Jul. 2, 2018, which is incorporated herein in its entirety.

BACKGROUND

Crop harvesting is commonly performed by a harvesting system comprising a combine harvester ("combine") equipped with a removable header designed for harvesting crops. In an attempt to increase the throughput of such harvesting systems, combines are being paired with increasingly wider headers. However, although the increased span of such wider headers may improve throughput by increasing the rate at which ground can covered by the harvesting system, the increased width of the header may result in a decrease in crop yield efficiency. In particular, given the rigid, flat configuration of headers typically used in such harvesting systems, the increased inability of wider, rigid frame header to conform to variations in terrain often results in a decrease in the amount of crop that is harvested as the harvesting system travels over uneven terrain.

Additionally, increasing the width of the header of a harvesting system often increases the structural loads imparted by the heavier, wider header onto the combine. As a result, many combines that are used in such wider header harvesting systems incorporate reinforced combine structures configured to support the added weight of a wider header and to withstand and resist the increased dynamic loads that such wider headers impart. In addition to increasing the material costs required to manufacture such reinforced combines, the added mass of such reinforced combines also typically increases the costs of operating the harvesting system.

SUMMARY

One implementation of the present disclosure is a harvesting system that includes a harvesting combine and a harvesting header. The harvesting header includes a center section, a left wing hingedly attached to the center section, and a right wing hingedly attached to the center section. The header is pivotally attached to a support structure of the harvesting combine. The header is configured to pivot relative to the support structure to transition between a first position in which the header is at least partially supported by a ground surface and a second position in which the header is entirely supported by the combine. When the header is in the first position, the ability of the left wing and the right wing to pivot upward or downward relative to the center section is constrained to a first operating range. When the header is in the second position, the ability of the left wing and the right wing to pivot upward or downward relative to the center section is constrained to a second operating range. The first operating range is greater than the second operating range.

According to some embodiments, the second operating range is greater than 0°. According to some embodiments, the first operating range corresponds to a range that extends between approximately 5.0° upwards and approximately 5.0° downwards as measured relative to the center section. According to some embodiments, the second operating range is approximately 20% of the first operating range. According to some embodiments, the second operating range corresponds to an angular displacement of approximately 2.0°.

According to some embodiments, the harvesting system further includes a variable spring suspension system configured to selectively constrain the pivoting of the left wing and right wing relative to the center section to either the first operating range or the second operating range.

One implementation of the disclosure is a harvesting system including a harvesting combine, a harvesting header and a suspension system. The harvesting header includes a center section, a left wing hingedly attached to the center section, and a right wing hingedly attached to the center section. The suspension system has an engageable first variable state and an engageable second variable state. The second variable state is different than the first variable state. When the header is in a harvesting position and the first variable state of the suspension system is engaged, the left wing and right wing are allowed to pivot relative to the center section. When the header is elevated entirely off of the ground, the second variable state of the suspension system is automatically engaged and the left wing and the right wing are allowed to pivot upward or downward relative to the center section.

According to some embodiments, the degree to which the left wing and right wing are allowed to pivot relative to the center section when the header is in the harvesting position is greater than the degree to which the left wing and right wing are allowed to pivot when the header is elevated entirely off of the ground.

According to some embodiments, when the first variable state of the suspension system is engaged, the right wing and left wing are allowed to pivot within a range of approximately 5.0° upwards and approximately 5.0° downwards as measured relative to the center section. According to some embodiments, when the second variable state of the suspension system is engaged, the right wing and left wing are allowed to pivot within a range that corresponds to an angular displacement of approximately 2.0°. According to some embodiments, when the second variable state of the suspension system is engaged, the left wing and right wing are allowed to pivot within a range that is approximately 20% less than the range within which the left wing and right wing are allowed to pivot when the first variable state of the suspension system is engaged.

According to some embodiments, directly subsequent to the second variable state of the suspension system being engaged, the position of the left wing relative to the center section corresponds to the position of the left wing relative to the center section directly prior to the second variable state of the suspension system being engaged, and the position of the right wing relative to the center section corresponds to the position of the right wing relative to the center section directly prior to the second variable state of the suspension system being engaged.

According to some embodiments, the suspension system includes a fluid cylinder fluidly connected to an accumulator and a valve selectively openable to permit flow between the fluid cylinder and the accumulator. The suspension system is configured to engage the second variable state by closing the valve to block flow between the fluid cylinder and accumulator. According to some embodiments, the fluid cylinder is fluidly connected to the accumulator by an attenuation hose.

According to some embodiments, fluid from the fluid cylinder is configured to flow into the attenuation hose when the second variable state of the suspension system is engaged.

One implementation of the present disclosure is a harvester system including a harvesting combine, and articulated header, and a variable spring suspension system. The articulated header is defined by at least a first section and a second section. The variable spring suspension system has a first variable spring state and a second variable spring state. In the first variable spring state, the suspension system is configured to allow the first section and second section to pivot relative to one another according to a first range of motion. In the second variable spring state, the suspension system is configured to allow the first section and second section to pivot relative to one another according to a second range of motion. The first range of motion is greater than the second range of motion.

According to some embodiments, the header is pivotally attached to the combine and configured to move between a first position in which at least a portion of the header weight is supported by the ground and a second position in which an entirety of the header weight is supported by the combine. The suspension system is configured to activate the first variable spring state when the header is in the first position and to activate the second variable spring state when the header is in the second position.

According to some embodiments, the harvester system further includes a control system having an automatic header height control mode. The suspension system is configured to automatically activate the second variable spring state in response to the header height control mode being deactivated.

According to some embodiments, the suspension system includes a fluid cylinder fluidly connected to an accumulator and a valve selectively openable to permit flow between the fluid cylinder and the accumulator. The suspension system is configured to activate the second variable spring state by closing the valve to block flow between the fluid cylinder and accumulator.

According to some embodiments, the suspension system includes a first coiled spring and a second coiled spring. The first coiled spring is configured to impart a greater spring force than the second coiled spring. The suspension system is configured to selectively engage the first coiled spring to impart a spring force on the first section when the header is in the second position.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIGS. 1A-1C illustrate a harvester in a harvesting configuration travelling over different types of terrain, according to some embodiments.

DETAILED DESCRIPTION

Referring generally to the FIGURES, a suspension system 200 for a harvester 100 configured to reduce structural loads is shown. As will be described in more detail below, suspension system 200 is configured as a variable spring rate suspension system, which allows the header 104 to more closely and easily follow terrain while the harvester 100 is in a harvesting mode, while also providing the header 104 with the ability to flex during an elevated, non-harvesting transport configuration of the header 104. In doing so, the suspension system 200 reduces the structural loads that the combine 102 supporting the header 104 is subject to during operation of the harvester 100. As such, the suspension system 200 allows the width of the header 104 to be increased (so as to, e.g., increase harvesting throughput) without requiring reinforcement of the structure of the combine 102 to support the increased mass of the wider header 104.

Figure 1B:
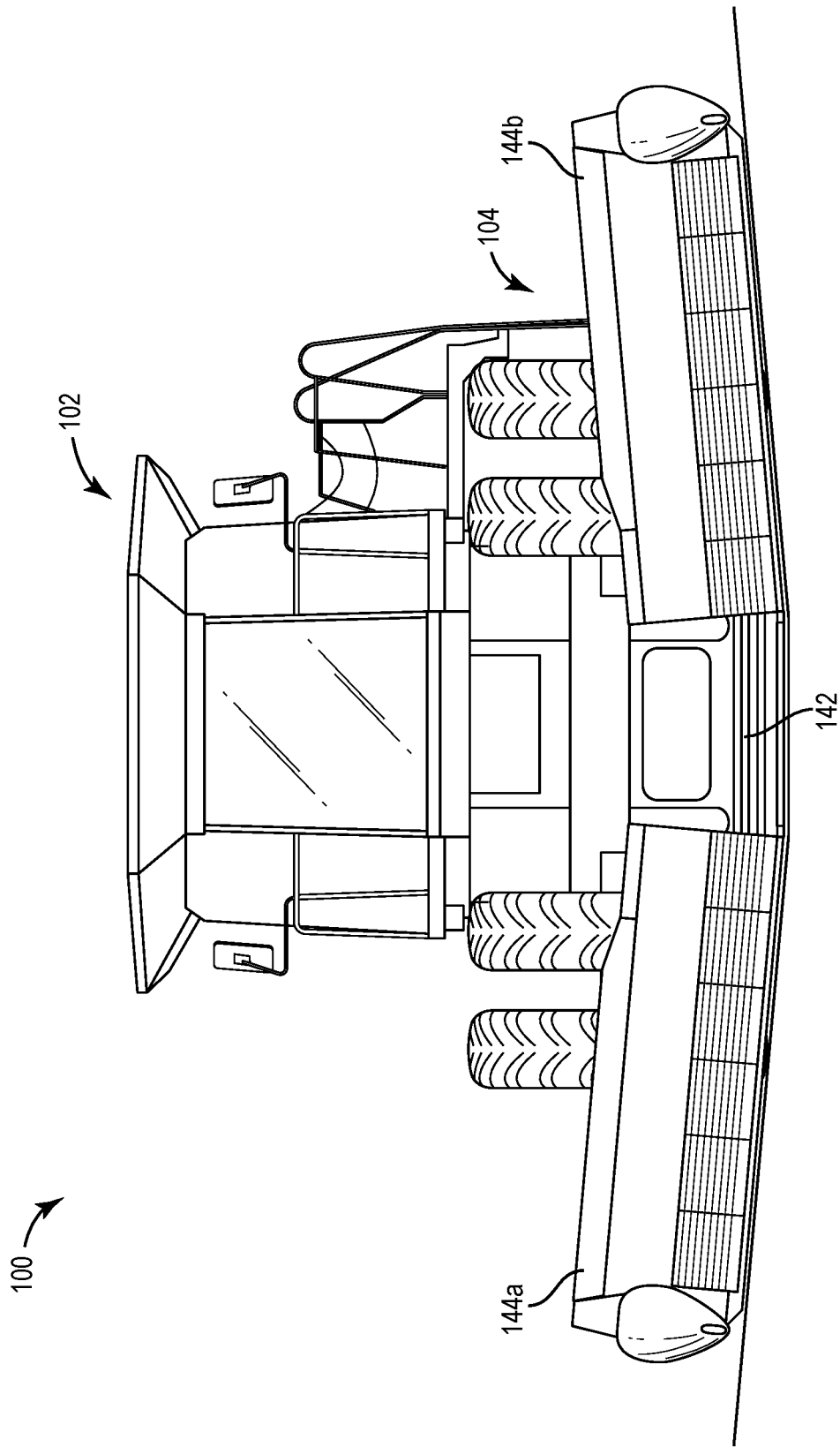
Figure 1C:
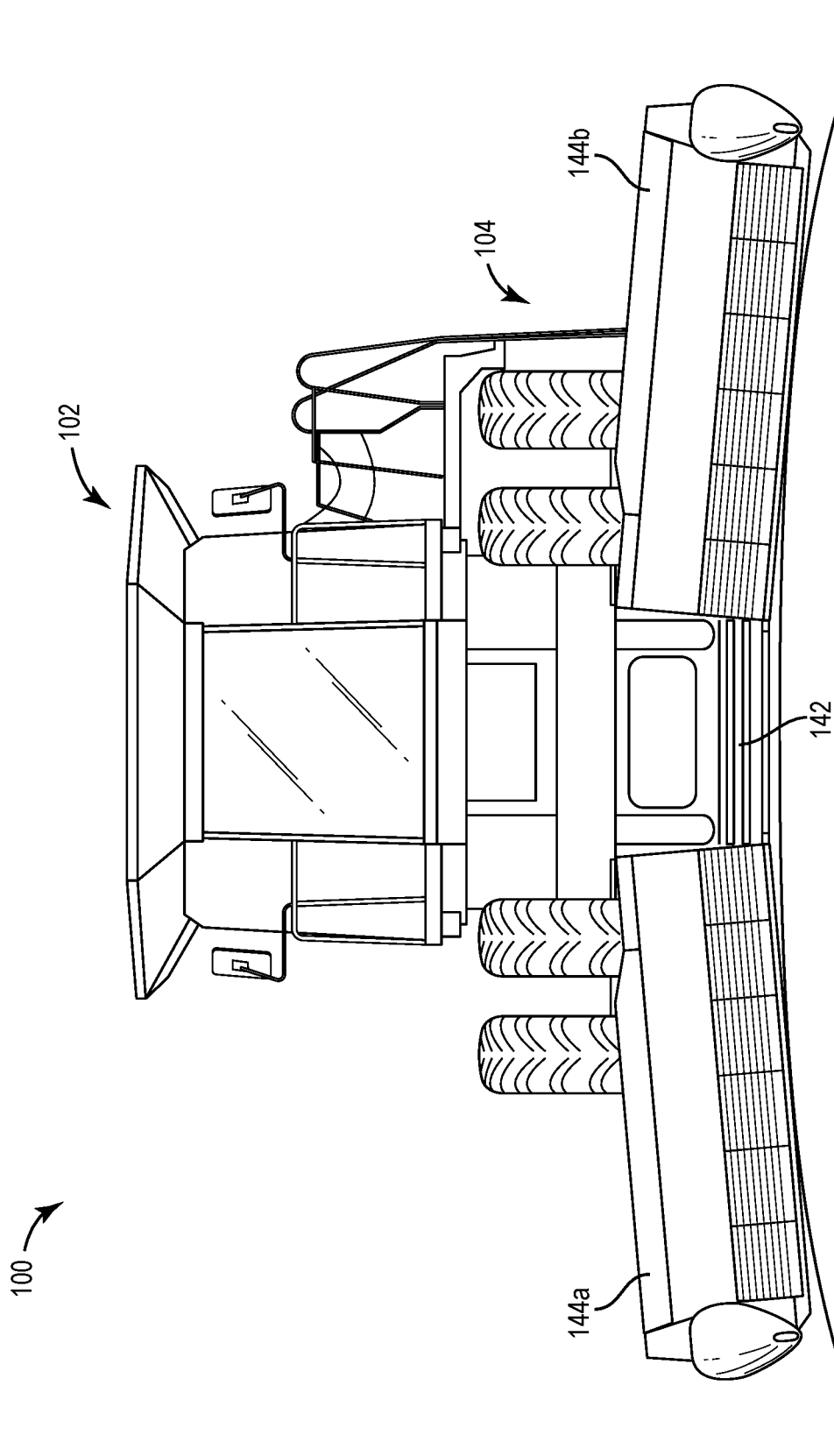

Referring to FIGS. 1A-1C, an agricultural harvester 100 according to one embodiment is shown in various harvesting configurations as the harvester 100 travels over terrain having varying contours. As illustrated in FIGS. 1A-1C, according to various embodiments, the harvester 100 includes a combine 102 and an agricultural harvesting header 104 supported on the front of the combine 102.

Figure 2:
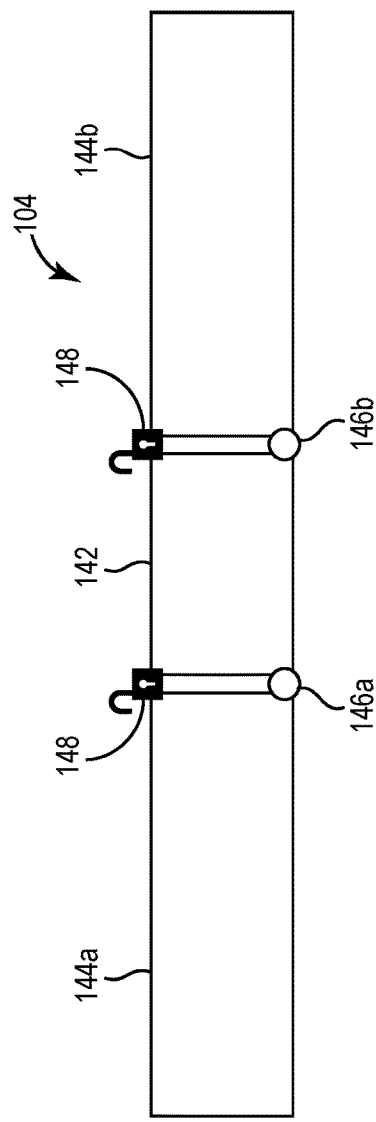
FIG. 2 is a simplified block diagram illustrating a top view of a header, according to some embodiments.

As illustrated by the simplified block diagram of FIG. 2, according to various embodiments, the header 104 defines an articulated structure comprising a center section 142 to which a left wing 144a is hingedly connected by a left hinge joint 146a and to which a right wing 144b is hingedly connected by a right hinge joint 146b. The connection of the left wing 144a to the center section 142 via left hinge joint 146a allows the left wing 144a to pivot upwards or downwards relative to the center section 142 about a generally horizontal axis along which the left hinge joint 146a extends. Similarly, the connection of the right wing 144b to the center section 142 via right hinge joint 146b allows the right wing 144b to pivot upwards or downwards relative to the center section 142 about a generally horizontal axis along which the right hinge joint 146b extends. As will be understood, given the independent hinged attachment of each of the left wing 144a and the right wing 144b to the center section 142, the left wing 144a may pivot in any direction (i.e. upwardly or downwardly) and to any degree, irrespective of any pivoting of the right wing 144b about the center section 142, and vice versa.

Although, as described below, the harvester 100 comprises a suspension system 200 configured to maintain the header 104 in a generally flat configuration, according to some embodiments, such as, e.g., illustrated in FIG. 2, a manually or automatically actuated lock 148 may be provided between left wing 144a and center section 142 and/or between right wing 144b and center section 142 which may optionally be used in situations in which a user may desire to fixedly and rigidly restrain the pivoting movement of left wing 144a and/or right wing 144b relative to the center section 142.

As the harvester 100 transitions from travelling along generally flat terrain (during which the center section 142, left wing 144a and right wing 144b each extend along a generally horizontal plane, such as, e.g., illustrated in FIG. 1A, that is substantially parallel to the terrain on which the header 104 is supported) to uneven terrain, the hinged connections of the left wing 144a and right wing 144b to the center section 142 allow the header 104 to more closely adapt to and conform to the contours of the variable terrain (such as, e.g., illustrated in FIGS. 1B and 1C).

In addition to increasing crop yield, by allowing the left wing 144a and right wing 144b to independently flex and adapt to changing terrain, the mass of the header 104 that is accelerated as the header 104 travels over uneven terrain is decreased, thereby minimizing the structural loads on the combine 102. Thus, the articulated configuration of the header 104 allows the width of the header 104 to be increased (as compared to a rigid, non-articulated header) without necessarily resulting in increased stress on the combine 102, thereby obviating the need to reinforce the combine 102 to support the wider width header 104.

The combine 102 generally includes a combine harvester vehicle 106 and feederhouse 108 pivotally attached about a rear end to a lower portion of the combine harvester vehicle 106 (such as, e.g., to a chassis of the harvester vehicle 106). A forward end of the feederhouse 108 is configured to support the header 104. According to various embodiments, one or more feederhouse actuators (not shown) are operably coupled between the rear end of the feederhouse 108 and the combine harvester vehicle 106. The feederhouse actuators may comprise any number of known actuator arrangements, with selective manual and/or automatic activation of the feederhouse actuator(s) being configured to cause the rear end of the feederhouse 108 to pivot relative to the combine harvester vehicle 106, thereby resulting in a vertical movement of the forward end of the feederhouse 108, as well as the resultant vertical movement of the attached header 104, in an upwards or downwards direction, such as illustrated, e.g., in FIG. 3.

Figure 3:
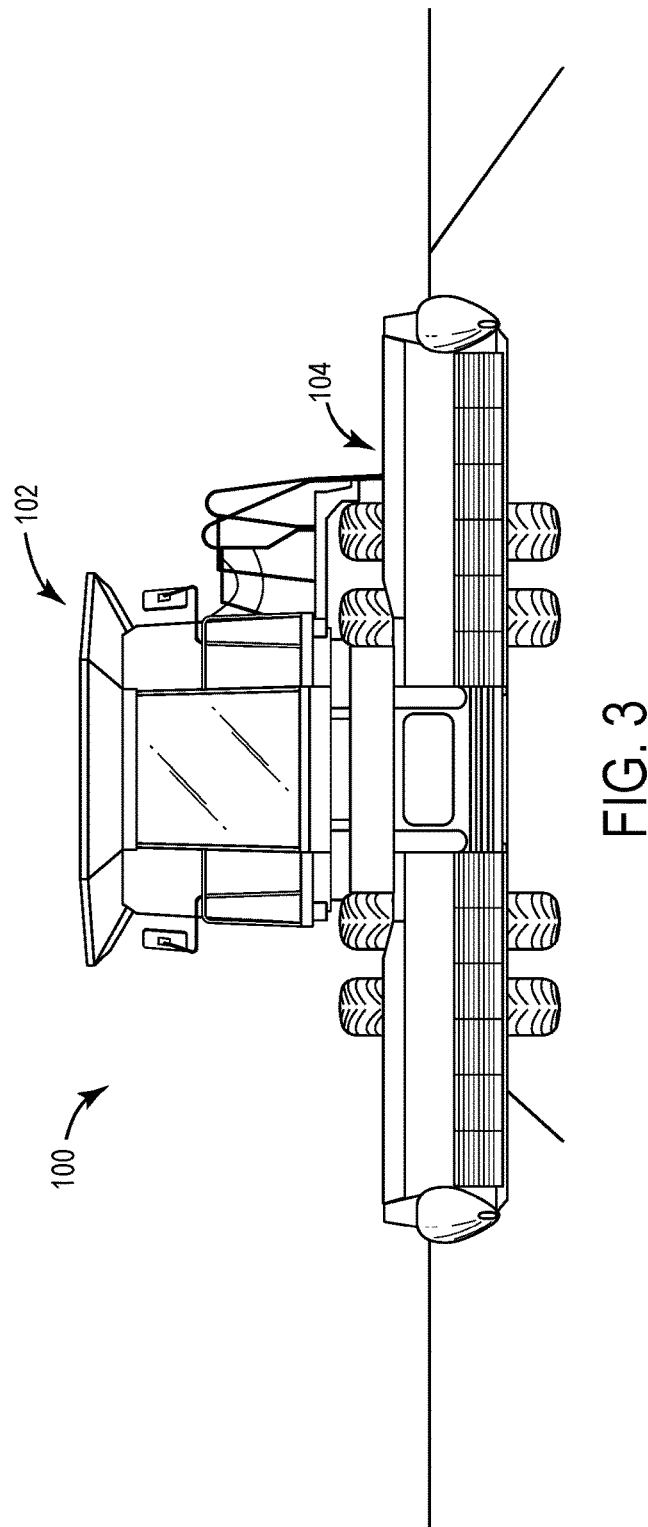
FIG. 3 illustrates a harvester in a non-harvesting transport configuration, according to some embodiments.

As will be understood, the activation of these feederhouse actuators may allow the harvester 100 to transition between a harvesting configuration in which the weight of the header 104 is at least partially supported by the ground, to a non-harvesting transport configuration in which the header 104 is elevated with reference to the ground (and in which configuration the weight of the header 104 is supported entirely by the combine 102), such as, e.g., illustrated in FIG. 3.

In light of the articulated configuration of the header 104, when feederhouse actuator(s) are activated to raise the header 104 to an elevated, non-harvesting transport configuration such as shown in FIG. 3, the hinged attachment of left wing 144a and right wing 144b ("wings 144") to center section 142 via left hinge joint 146a and right hinge joint 146b, respectively, may cause the outermost ends of wings 144 to sag relative to the height of center section 142. As will be understood, the amount of downward displacement or sag of the outermost ends of the wings 144 as measured relative to the center section 142 increases as the width of the wings 144 is increased.

As described above, the ability of wings 144 to pivot substantially relative to center section 142 may advantageously allow the header 104 to conform to the terrain during harvesting. However, such substantial pivoting movement of the wings 144 relative to the center section 142 may be undesirable when the header 104 is in an elevated position (e.g., when the harvester 100 is being turned around on end rows or during non-harvesting transport of the harvester 100). In particular, leaving the wings 144 unsupported and free to pivot relative to center section 142 while the header 104 is elevated may cause the outermost ends of wings 144 to fully lower, thereby decreasing clearance to the ground even when the header 104 is in a fully raised configuration, which may allow inadvertent contact between the ground and header 104 that could damage the header 104.

Although preventing sagging of the outermost ends of the wings 144 in order to maintain a substantially flat profile of the header 104 may be desirable when the header 104 is in an elevated configuration such as, e.g., illustrated in FIG. 3—for reasons as described with reference to rigid frame, non-articulated headers above—it may be undesirable to lock or otherwise fix the wings 144 into a substantially rigid configuration in an attempt to prevent the outermost ends of wings 144 from doing so. In particular, locking or otherwise restricting movement of the wings 144 relative to the center section 142 during an elevated configuration of the header 104 (such as, e.g., during non-harvesting transport of the harvester 100) may undesirably increase the dynamic loads that are imparted by the header 104 onto the combine 102.

Instead, as will be described in more detail below, the harvester 100 is advantageously provided with a suspension system 200 that allows for some degree of pivoting movement of the wings 144 of the header 104 relative to the center section 142 while also supporting the header 104 in a substantially flat profile during field transport of the harvester 100 (i.e. when the header 104 is lifted entirely off of the ground). In doing so, the suspension system 200 minimizes the amount of header 104 inertia that must be accelerated when encountering bumps in terrain, thereby reducing the forces imparted on the combine 102 during travel of the harvester 100 with the header 104 in an elevated configuration.

Accordingly, in various embodiments, the harvester 100 is provided with a variable spring rate suspension system 200 configured to be capable of being operated in a transport mode providing an increased degree of resistance to the displacement of the wings 144 relative to the center section 142 when the header 104 is in an elevated configuration (so as to, e.g., minimize or prevent the amount of downward displacement of the outermost ends of the wings 144 during non-harvesting transport of the harvester 100) and a harvesting mode providing a decreased degree of resistance to the displacement of the wings 144 relative to the center section 142 when the header 104 is in a harvesting configuration, so as to allow the hingedly attached wings 144 to pivot as needed relative to the center section 142 while the harvester 100 is in a harvesting configuration (i.e. when the header 104 is at least partially supported along the ground), thus minimizing the structural loading of the combine 102 by the header 104. As such, the suspension system 200 may allow the harvester 100 to incorporate a wider header 104 for more efficient harvesting throughput without requiring a reinforced combine 102 structure to support the wider width header 104.

According to various embodiments, when the harvester 100 is in a harvesting configuration (i.e. when the header 104 is at least partially supported by the ground, such as, e.g., illustrated in FIGS. 1A-1C) and the suspension system 200 is engaged in the harvesting mode, the suspension system 200 of the harvester 100 may exhibit a degree of stiffness that is configured to allow for upward and downward pivoting of the wings 144 by approximately no more than ±20.0°, more specifically by approximately no more than ±10.0°, and more specifically by approximately no more than ±5.0° as measured relative to the lateral axis along which the center section 142 extends. When the harvester 100 is an elevated, non-harvesting transport position (i.e. when the header 104 is elevated such that the mass of the header 104 is not supported by the ground) and the suspension system 200 is engaged in the transport mode, the degree stiffness of the suspension system 200 may be greater as compared to the stiffness characterizing the suspension system 200 in the harvesting mode, such that the upwards or downwards pivoting of the wings 144 is constrained to between approximately 10% and 30%, more specifically between approximately 15% and 25%, and even more specifically approximately 20% of the range through which the wings 144 are allowed to pivot when the harvester 100 is in the harvesting configuration. According to various embodiments, the upward and downward pivoting of the wings 144 as measured relative to the lateral axis along which the center section 142 extends is approximately no more than ±15.0°, more specifically is no more than approximately ±7.5°, and even more specifically no more than approximately ±5.00 when the harvester 100 is in a non-harvesting transport position (such as, e.g., illustrated in FIG. 3). By defining differing suspension spring rates in each of the harvesting and non-harvesting transport modes, the suspension system 200 is configured to allow for between an approximately 10% to approximately 20% reduction in the stress imparted onto the combine 102 by the articulated header 104, as compared to the structural load that would be imparted by a rigid, non-articulated header 104 having a similar width and mass.

As will be understood, the suspension system 200 may be defined by any number of and combination of different components that are arranged in a manner to allow for the selective change in spring rate of the suspension system 200 in the different operating modes, so as to, e.g., allow for the selective constraint of the movement of the wings 144 relative to the center section 142 according to first and second variable states. In particular, in a first variable state corresponding to the harvesting mode, the suspension system 200 is defined by a first stiffness that may, according to some embodiments, be configured such that movement of the wings 144 is constrained to a first range (such as, e.g., described with reference to the harvesting configuration above). Meanwhile, in a second variable state corresponding to a transport mode, the suspension system 200 is defined by a second stiffness that may, according to some embodiments, be configured such that movement of the wings 144 is constrained to a second range that is less than the first range (such as, e.g., described with reference to the non-harvesting transport configuration above).

For example, according to some embodiments (not shown), suspension system 200 may comprise a first set of coiled springs positioned about the left wing 144a and a second set of coils positioned about right wing 144b. Each of the first set and second set of coils comprise a first spring and a second spring. One or both of the length of the first spring and/or spring constant of the first spring differs from the second spring, such that the spring force of the first spring is greater than the spring force of the second spring. The first and second springs are configured to be independently engageable, such that, when the suspension system 200 is operated in the transport mode, the first spring is engaged, and the stiffness of the suspension system 200 is increased as compared to the stiffness of the suspensions system 200 during operation in the harvesting mode. Accordingly, in the transport mode the pivoting movement of the wings 144 about center section 142 of the header 104 may be constrained to a smaller range of motion than when the suspension system 200 is operated in the harvesting mode in which the first spring is disengaged, and the second spring is engaged.

Accordingly, in such embodiments, by selectively engaging the second springs, the decreased spring rate of the suspension system 200 in the harvesting mode may provide the wings 144 with sufficient ability to pivot about center section 142 so as to allow the wings 144 to adapt to the contours of changing terrain when the harvester 100 is in harvesting position. Meanwhile, by selectively engaging the first springs, the increased spring rate of the suspension system 200 in the non-harvesting transport mode may be configured to result in a more constrained movement of the wings 144 relative to the center section 142, thereby minimizing the degree of displacement of the outermost ends of the wings 144 relative to the center section 142 (and thereby minimizing the risk of the outermost ends inadvertently contacting the ground when the header 104 is in an elevated, transport position) while also providing the wings 144 with sufficient flexibility to pivot so as to minimize the dynamic loads on the combine 102 during non-harvesting transport of the harvester 100 (such as, e.g., illustrated in FIG. 3).

Alternatively, in other coiled spring embodiments of suspension system 200, a single coiled spring may be positioned about each of the left wing 144a and the right wing 144b. The suspension system 200 may further comprise a length adjusting mechanism associated with each of the left wing 144a and right wing 144b, which is selectively actuatable to increase or decrease the effective length of the coiled spring. During non-harvesting transport with the header 104 in an elevated transport position, the length adjusting mechanisms may be actuated to effectively shorten the lengths of the springs, thereby increasing the spring rate of the springs (and resultant stiffness of the suspension system 200) and thereby increasing the resistance to the movement of the wings 144 relative to center section 142. Meanwhile, engagement of the harvesting mode of the suspension system 200 may cause the length adjusting mechanisms to be actuated to effectively lengthen the springs, thereby decreasing the spring rate of the springs (and resultant stiffness of the suspension system 200) and thereby decreasing the degree of resistance to the movement of the wings 144 relative to the center section 142. As will be understood, according to various embodiments, the length adjusting mechanisms may be configured to allow the effective lengths of the springs to vary between first and second fixed lengths, while in other embodiments, the length adjusting mechanisms may be configured to allow the effective lengths of the springs to be varied as desired, thus allowing for greater or lesser degrees of constraint of the movement of the wings 144 relative to the center section 142 of the header 104 during different non-harvesting transport and/or harvesting uses of the harvester 100. Additionally, while in some such embodiments the length adjusting mechanisms of the wings 144 may be actuated by the suspension system 200 in tandem with one another, in other embodiments, the length adjusting mechanisms may be actuated independent of one another, such that the degree to which movement of the left wing 144a is constrained may vary from the degree to which movement of the right wing 144b is constrained, and vice versa.

According to other embodiments, the suspension system 200 may alternatively, or additionally, comprise one or more elements (such as, e.g., variable length legs) that may be selectively engaged and/or actuated to physically constrain the degree to which the wings 144 may deflect upwards and/or downward to a predetermined range of motion and/or block the wings 144 from deflecting upwards and/or downwards past a predetermined distance during different operational modes of the harvester. In some such embodiments, such physically constraining/blocking elements may be used in conjunction with the features of to any of variable spring rate suspension system 200 embodiments described herein. Alternatively, in other such embodiments in which the suspensions system 200 includes such constraining/blocking element, the suspension system 200 may be defined by a single fixed spring rate during operation of the harvester 100 according to any of the various operational modes of the harvester 100.

In yet other embodiments, the suspension system 200 may comprise a hydraulic system configured to provide for first and second variable states corresponding to the harvesting and non-harvesting transport modes of the suspension system 200 which selectively allow for differing degrees of resistance to the pivoting of the wings 144 relative to the center section 142. For example, in some embodiments (not shown), the suspension system 200 may comprise a pair a hydraulic circuits that are operably provided for each of the left wing 144a and right wing 144b, with a first circuit having a different volume and/or pressure of fluid than a second, distinct circuit defining the pair of hydraulic circuits, such that the suspensions system 200 is defined by differing degrees of stiffness depending on which hydraulic circuit the suspension system 200 is fluidly engaged to.

Figure 4:
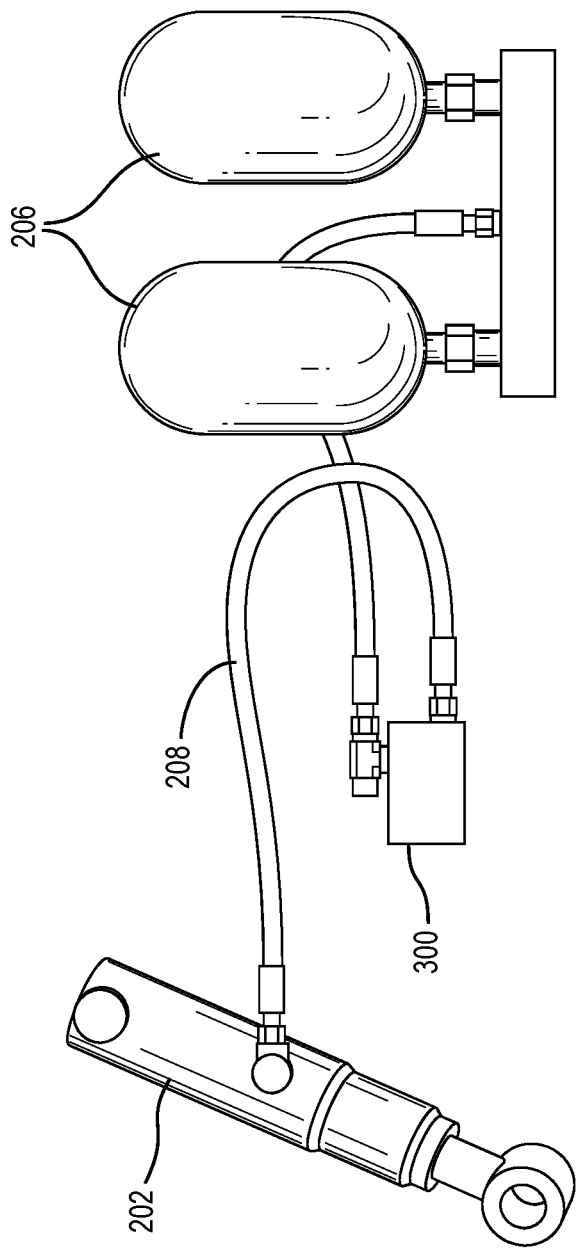
FIG. 4 is a simplified diagram illustrating a suspension system, according to some embodiments.

Referring to FIG. 4, a simplified schematic of a hydraulic based spring suspension system 200 comprising a blocker valve 300 which is configured to provide for first and second variable states corresponding to harvesting and non-harvesting transport modes of the suspensions system 200, respectively, according to one embodiment is illustrated. The suspension system 200 illustrated in FIG. 4 corresponds to a spring suspension system 200 configured for use with one of the left wing 144a or right wing 144b of the header 104, with the other of the left wing 144a or right wing 144b being provided with a substantially similar, albeit mirrored, suspension system 200 as shown in and described with reference to FIG. 4.

Suspension system 200 generally comprises a fluid cylinder 202 that is fluidly connected to one or more accumulators 206 via an attenuation hose 208. The accumulators 206 are configured to store a volume of pressurized fluid (such as, e.g., incompressible hydraulic fluid) that is supplied to the fluid cylinder 202 via the attenuation hose 208. As fluid flows into or out from the fluid cylinder 202, the fluid cylinder 202 is configured to extend or retract. As the fluid cylinder 202 is configured to suspend the wing 144, the retraction and extension of the fluid cylinder 202 in response to changes in the amount of fluid within fluid cylinder 202 causes the wing 144 to move pivotally about the center section 142, resulting in the upward or downward movement of the wing 144 relative to the center section 142.

A blocker valve 300 is fluidly disposed between the fluid cylinder 202 and the accumulators 206. As will be described with more detail with reference to FIGS. 6A-9B below, the blocker valve 300 is configured to allow for selective flow of fluid between the fluid cylinder 202 and the accumulators 206, allowing the fluid cylinder 202 to provide varying degrees of suspension of the wing 144, which in turn allows the suspension system 200 to provide for first and second variable states in which the suspension system 200 is defined having differing stiffnesses that selectively allow for differing degrees of resistance to the pivoting of the wings 144 relative to the center section 142 during harvesting and non-harvesting transport of the harvester 100.

Figure 6B:
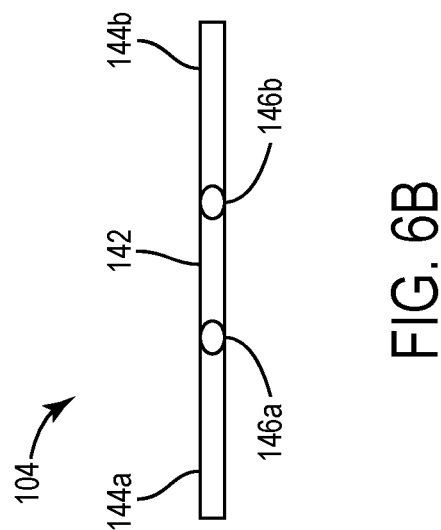
FIG. 6B is a simplified general block diagram illustrating a front view of a header during the harvesting configuration of the harvester shown in FIG. 6A, according to some embodiments.
Figure 6A:
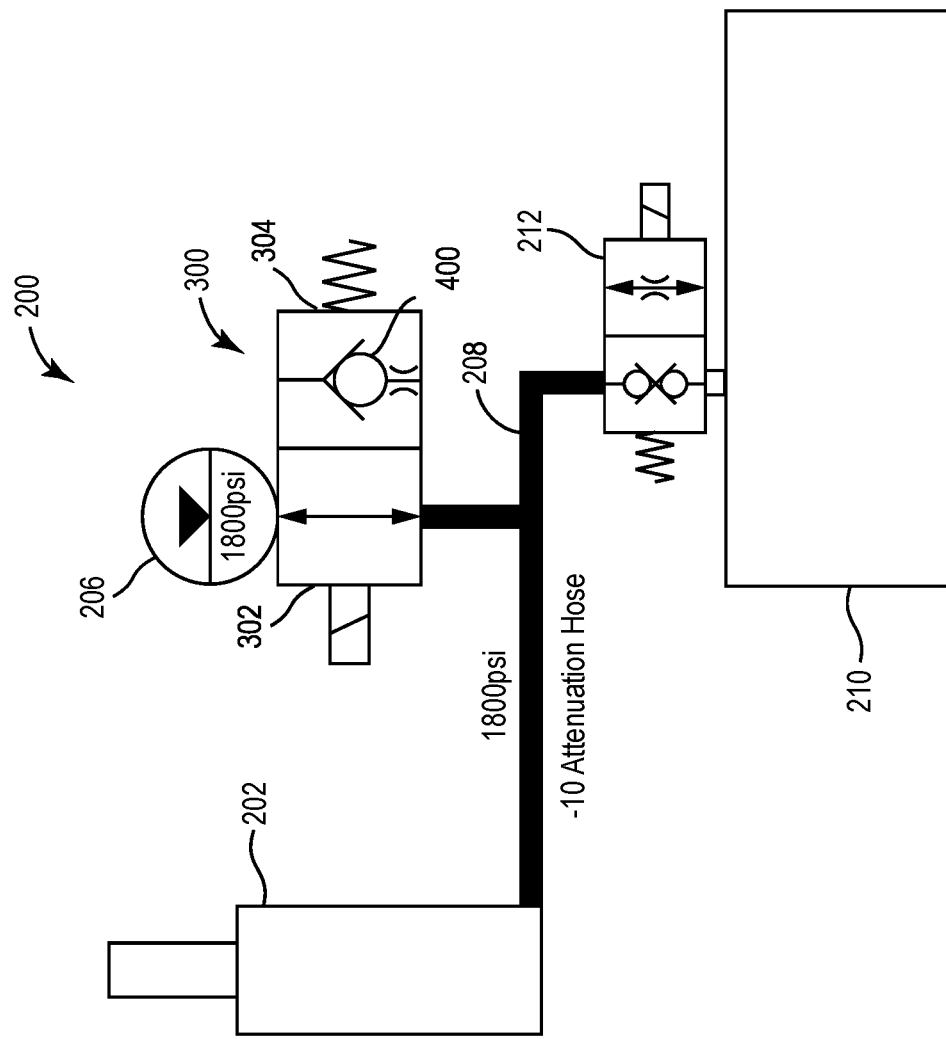
FIG. 6A is a simplified general block diagram illustrating a suspension system during a harvesting configuration of a harvester, according to some embodiments.

As shown in FIG. 6A, the accumulators 206 are additionally fluidly connected to a hydraulic block 210, which serves as a source of fluid for the accumulators 206. Fluid from the hydraulic block 210 is supplied to the accumulators 206 in response to the selective activation of a valve 212 to permit flow between the hydraulic block 210 and accumulators 206. Once sufficient fluid has been allowed to fill the accumulators 206 to a desired pressure, the valve 212 may be activated to a closed configuration. As will be understood, according to some embodiments, a single hydraulic block 210 may be common to the suspension systems 200 of both the left wing 144a and the right wing 144b, while in other embodiments, the suspension systems 200 of each of the left wing 144a and the right wing 144b may comprise distinct, individual hydraulic blocks 210.

Figure 5B:
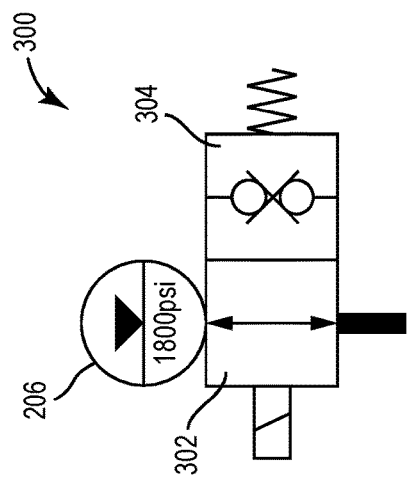
FIGS. 5A-5C are simplified general block diagrams illustrating a blocker valve, according to some embodiments.
Figure 5A:
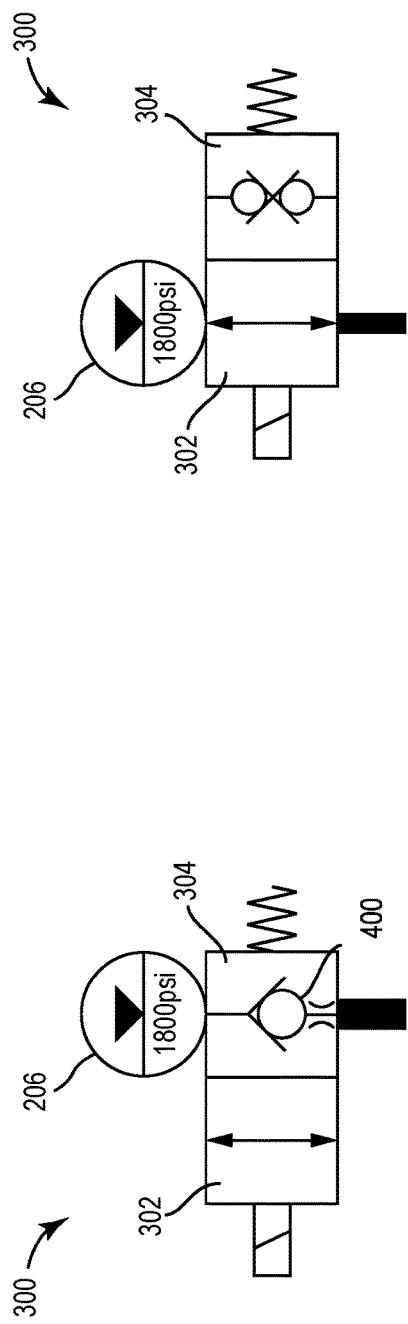
Figure 5C:
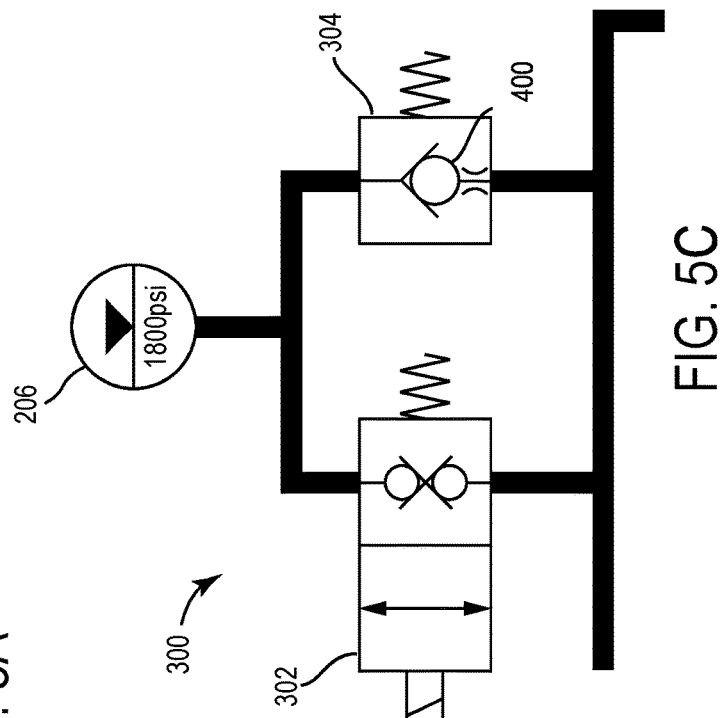

Referring to FIGS. 5A-5C, a blocker valve 300 according to various embodiments is illustrated. In general, the blocker valve 300 is selectively actuatable between a flow position, defined by a flow structure 302 and a restricted flow position defined by a flow-restriction structure 304. As will be understood, blocker valve 300 may be biased to either the flow position or restricted-flow position, and may be selectively energized or otherwise activated between the flow and restricted flow positions according to any number of different arrangements, including mechanical and/or electromechanical arrangements.

Additionally, while in some embodiments the activation of the blocker valve 300 between the flow position and the restricted-flow position may be controlled directly by the operator as desired, according to other embodiments, the activation of the blocker valve 300 may be controlled by a control system of the harvester 100. For example, according to some embodiments, the harvester 100 may comprise a control system, which, in addition to controlling other aspects of the operation of the harvester 100, may additionally be configured to control the activation of the blocker valve 300. According to some such embodiments, the control system may be configured to automatically activate the blocker valve 300 to the restricted-flow position upon the control system exiting out of an auto-header height mode of the control system and/or in response to the feederhouse 108 (and attached header 104) being lifted up and elevated with respect to the ground. In yet other embodiments, the control system may be configured such that, when the harvester 100 is operated in a manual mode, the blocker valve 300 is automatically activated to a restricted-flow position upon the control system receiving a signal from ground detection sensors that the header 104 has been elevated off of the ground.

When the blocker valve 300 is in the restricted-flow position, fluid present within the fluid cylinder 202 and attenuation hose 208 is prevented from flowing into the accumulators 206. However, according to some embodiments, it may be advantageous to allow for a limited degree of fluid flow from the accumulators 206 into the attenuation hose 208 and fluid cylinder 202. Accordingly, as shown in FIG. 5A, according to some embodiments, the flow-restriction structure 304 of blocker valve 300 may comprise an orificed check valve structure 400, which is configured to restrict flow from the attenuation hose 208 and fluid cylinder 202 into the accumulators 206, but which allows for flow from the accumulators 206 into the attenuation hose 208, even when the blocker valve 300 is in the restricted flow position.

In other embodiments, it may be desired that there be no flow in either direction (i.e. no flow of fluid into or out of the accumulators 206) when the blocker valve 300 is in the restricted flow position. According to some such embodiments, the flow-restriction structure 304 of blocker valve 300 may comprise a double-checked valve structure (such as, e.g., illustrated in FIG. 5B) or other structure configured to prevent flow in either direction through the blocker valve 300.

As shown in FIG. 5C, in some embodiments in which the blocker valve 300 comprises a flow-restriction structure 304 configured to prevent flow in either direction through the blocker valve 300 (such as, e.g., a double-checked valve flow-restriction structure 304), the suspension system 200 may include an orificed check valve structure 400 arranged fluidly in parallel with the blocker valve 300. By providing an alternate fluid path through which fluid from the accumulators 206 may flow into the attenuation hose 208, the orificed check valve structure 400 may allow for restricted flow of fluid from the accumulators 206 into the attenuation hose 208 even when the blocker valve 300 is in the restricted-flow position.

The ability of the suspension system 200 to provide for first and second variable states which selectively allow for differing degrees of pivoting of the wings 144 relative to the center section 142 will now be described with reference to FIGS. 6A-9B.

Referring to FIGS. 6A and 6B, a simplified block diagram of the suspension system 200 and the header 104 configuration is shown during harvesting operation of the harvester 100 according to some embodiments. As described above, during harvesting, the articulated configuration of header 104 (in which left wing 144a is hingedly attached to center section 142 via a left hinge joint 146a and in which right wing 144b is hingedly attached to center section 142 via a right hinge joint 146b) allows the wings 144 of the header 104 to pivot upward and/or downward relative to the center section 142 to allow the header 104 to more closely follow the contours of the terrain.

As shown in FIG. 6A, to facilitate the ability of the wings 144 to travel over and follow contours in terrain during harvesting operation, the blocker valve 300 is in a flow configuration during the harvesting mode of the suspension system 200, in which the flow structure 302 of the blocker valve 300 is aligned between the accumulators 206 and the attenuation hose 208 so as to allow fluid to freely flow between the accumulators 206 and fluid cylinder 202. As described above, by allowing fluid to flow into and out from the fluid cylinder 202 the fluid cylinder 202 is able to extend and retract as needed in response to changes in terrain. As will be understood, according to various embodiments, a float system configured to assist the header 104 in adapting to changes in terrain (such as, e.g., by monitoring changes in pressure imparted onto the header 104 and assisting in the flow of fluid into and out from the fluid cylinder 202 so as to maintain a desired target pressure) may be incorporated into harvester 100.

Because fluid is allowed to flow freely between the accumulators 206 and fluid cylinder 202 during harvesting operation of the device, the pressure within the attenuation hose 208 will be substantially the same as the pressure within the accumulators 206. The simplified block diagram of FIG. 6B illustrates the header 104 when the header 104 is positioned on substantially flat terrain, and as such, the entire header 104 is shown in FIG. 6B as extending in a generally planar manner. However, as will be understood, if the simplified block diagram of FIG. 6B were to represent the header 104 along uneven terrain, the wings 144 of header 104 would be shown as extending substantially parallel to the terrain above which the wings 144 extended, such that the wings 144 would extend at non-zero degree angles relative to the center section 142.

Figure 7B:
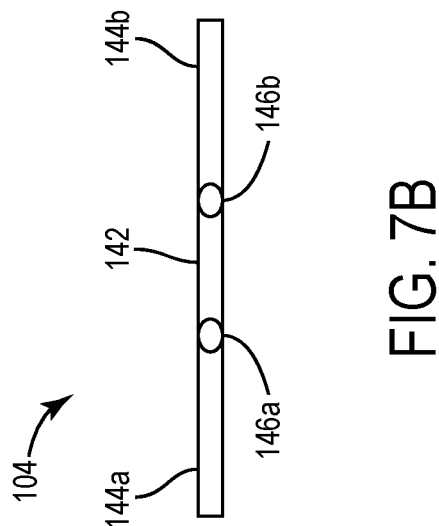
FIG. 7B is a simplified general block diagram illustrating a front view of a header during the transition configuration of the harvester shown in FIG. 7A, according to some embodiments.
Figure 7A:
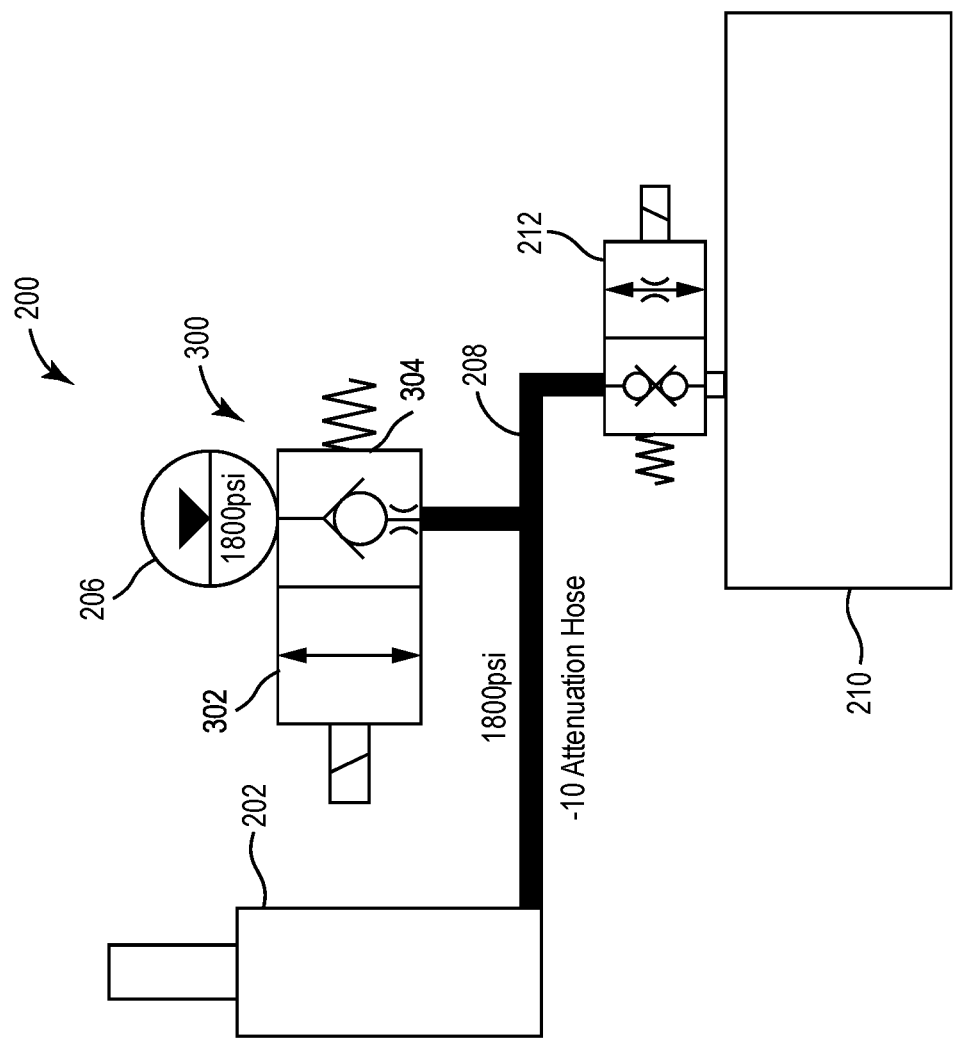
FIG. 7A is a simplified general block diagram illustrating a suspension system during a transition configuration of a harvester, according to some embodiments.

Referring to FIG. 7A, a simplified diagram of the suspension system 200 according to one embodiment is illustrated representative of a transition configuration of the harvester 100, in which the header 104 is still supported by the ground (i.e. the header 104 has not been elevated to a point where the combine 102 supports the entirety of the weight of the header 104) and in which the blocker valve 300 has been deenergized or otherwise deactivated from the flow position to the restricted-flow position.

In the transition configuration, the switching of the blocker valve 300 into the restricted-flow position prevents any fluid from flowing into or out from the accumulators 206. Upon entering into the transition configuration, the amount of fluid within the fluid cylinder 202 and attenuation hose 208 corresponds to the amount of fluid that had been present within the fluid cylinder 202 and attenuation hose 208 immediately prior to the blocker valve 300 being switched to the restricted-flow position. Accordingly, upon entering the transition configuration (i.e., upon initiation of the non-harvesting transport mode of the suspensions system 200), the wings 144 are 'locked' in their last position prior to the harvester 100 being put into the transition configuration. The 'locked' configuration of the wings 144 may correspond to a configuration of the wings 144 in which one or both of the wings 144 extend angled upward relative to center section 142, extend angled downward relative to center section 142, and/or extend substantially parallel to center section 142. As will be understood, the configuration of the wings 144 in the 'locked' position will depend on whether the fluid cylinder 202 was in a retracted, expanded, or neutral state immediately prior to switching the blocker valve 300 into the restricted-flow configuration.

As illustrated in FIG. 7B, because the header 104 remains partially supported by the ground in the transition configuration, the wings 144 of the header 104 remain extending in a direction substantially parallel to the terrain above which the wings 144 are supported. As similarly described with reference to FIG. 6B, the header 104 that is represented by the simplified block diagram of FIG. 7B is shown in a configuration in which the header 104 is positioned atop substantially horizontal terrain. However, as will be understood, if the simplified block diagram of FIG. 7B were to represent the header 104 positioned along uneven terrain, the wings 144 of header 104 would be shown as extending substantially parallel to the surface above which the wings 144 extend, such that the wings 144 would extend at non-zero degree angles relative to the center section 142.

Figure 8B:
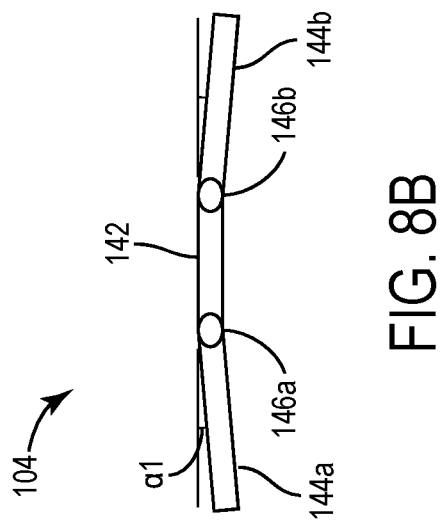
FIG. 8B is a simplified general block diagram illustrating a front view of a header during the non-harvesting transport configuration of the harvester shown in FIG. 8A, according to some embodiments.
Figure 8A:
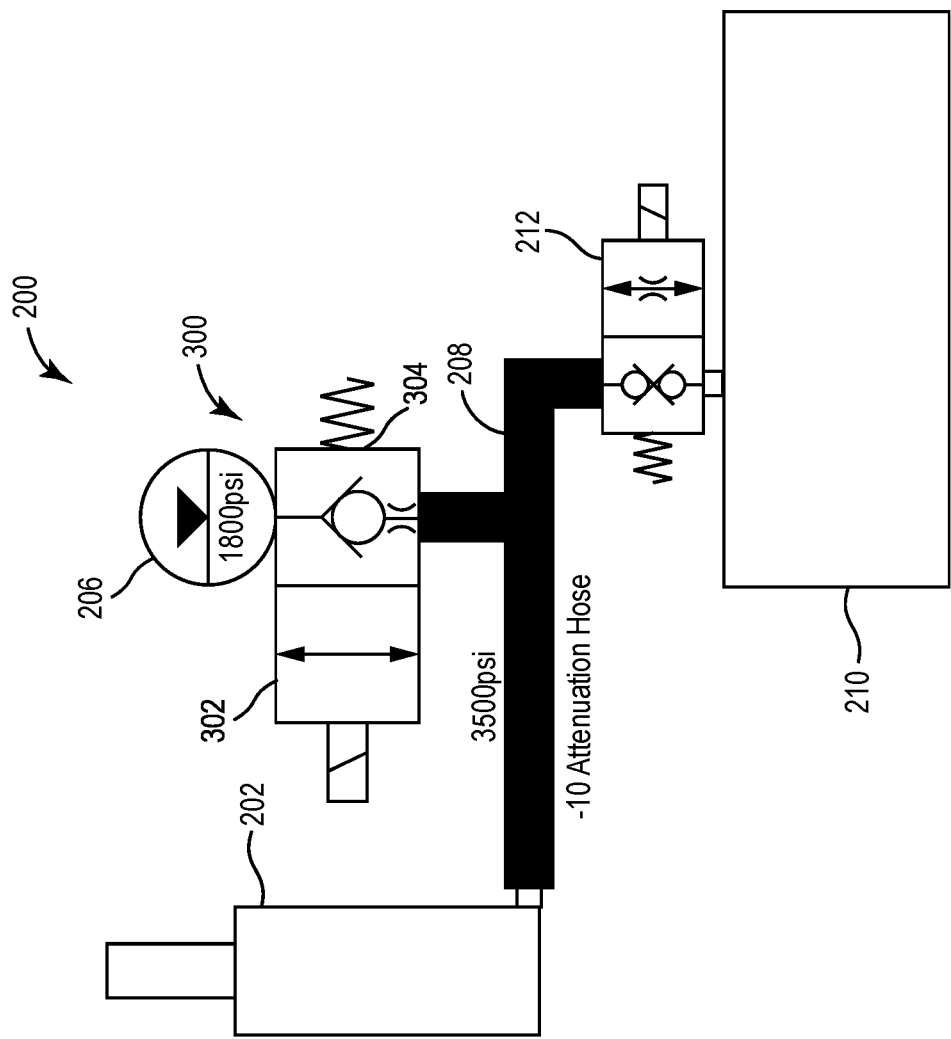
FIG. 8A is a simplified general block diagram illustrating a suspension system during a non-harvesting transport configuration of a harvester, according to some embodiments.

Referring to FIG. 8A, a simplified block diagram representative of the suspension system 200 during non-harvesting transport of the harvester 100 with the header 104 in an elevated position in which the weight of the header 104 is entirely supported by the combine 102 is shown according to one embodiment. As shown in FIG. 8A, in such an elevated, non-harvesting configuration of the header 104, the blocker valve 300 remains closed in a restricted-flow configuration, in which flow of fluid from the fluid cylinder 202 and attenuation hose 208 into the accumulators 206 is prevented. According to various embodiments, in order to decrease the degree of stiffness of the suspension system 200 when in the non-harvesting mode, the attenuation hose 208 may be constructed with a desired degree of elasticity and resilience, which allows the attenuation hose 208 to expand to hold increased volumes of fluids as compared to an initial, neutral configuration of the attenuation hose 208. Although the flow of fluid into the accumulators 206 is prevented by the blocker valve 300, fluid is free to flow between the fluid cylinder 202 and attenuation hose 208 during the elevated, non-harvesting transport configuration of the header 104. As such, when the header 104 is elevated, causing the wing 144 to no longer be supported the ground, the elastic nature of the attenuation hose 208 is configured to allow some, or all, of the fluid that was 'locked' in the fluid cylinder 202 during the transition configuration (as described with reference to FIGS. 7A and 7B above) to flow into the attenuation hose 208, thereby increasing the volume of 'locked' fluid already present within the attenuation hose 208 (as also described with reference to FIGS. 7A and 7B above).

As representatively illustrated by the simplified block diagram of FIG. 8A, the displacement of some or all of the fluid from the fluid cylinder 202 into the attenuation hose 208 increases the pressure of the fluid within the attenuation hose 208 to a pressure that is greater than the pressure of the fluid stored within the accumulators 206. Meanwhile, as representatively illustrated by the simplified block diagram of FIG. 8B, the decrease in the volume of fluid within the fluid cylinder 202 resulting from the displacement of fluid from the fluid cylinder 202 into the attenuation hose 208 decreases the ability of the fluid cylinder 202 to suspend the wing 144, which in turn causes the wing 144 to pivot downward relative to the center section 142 by an angle of α1 from an initial wing 144 position defined by the position of the wing 144 in the transition configuration (which in turn, corresponds to last position of the wing 144 during the last harvesting configuration of the header 104 prior to the blocker valve 300 being switched to a restricted-flow position).

According to various embodiments, the angle α1 may range from approximately 0.05° to 1.5°, more specifically between approximately 0.5° and 1.0°, and even more specifically between approximately 0.6° and 0.8°. As will be understood, the angle α1 by which the left wing 144a is pivoted downwards relative to the center section 142 during the elevated, non-harvesting transport configuration may be the same or may be different than the angle α1 by which the right wing 144b is pivoted downwards relative to the center section 142 during the elevated, non-harvesting transport configuration.

Although, as shown in FIG. 8B, the wings 144 of the header 104 will exhibit some degree of sagging (i.e. pivoting of the wings 144 downwards relative to the center section 142), with respect to the initial position of the wings 144 as defined by the position of the wings 144 during the transition configuration, the position of the wings 144 during the elevated, non-harvesting transport configuration may extend at an upwards angle relative to the center section 142, generally planar with the center section 142, or at a downwards angle relative to the center section 142. As will be understood, the angle(s) relative to the center section 142 at which the wings 144 extend during the elevated, non-harvesting transport configuration will depend on factors including the angle(s) of the wings 144 relative to the center section 142 during the last harvesting configuration of the header 104 prior to the blocker valve 300 being switched to a restricted-flow position as well as the angle(s) α1 by which the wings 144 are pivoted downwards during the elevated, non-harvesting transport configuration.

According to various embodiments, as the harvester 100 is in the elevated, non-harvesting transport configuration (such as, e.g., represented in FIGS. 8A and 8B), the harvester 100 may transition to a downward flex configuration in response to the mass of the header 104 being subject to a downwards acceleration force (such as, e.g., in response to the harvester 100 travelling over uneven terrain). As illustrated in FIG. 9A, during such additional loading of the header 104 in the downward flex configuration, additional fluid flows out of the fluid cylinder 202 and into the attenuation hose 208. This additional fluid causes the volume of fluid within the attenuation hose 208 to further increase from the increased volume that the attenuation hose 208 was subject to during the elevated, non-harvesting transport configuration. As shown in FIG. 9A, as a result of this additional fluid now held within the attenuation hose 208, the pressure within the attenuation hose 208 is further increased.

Figure 9B:
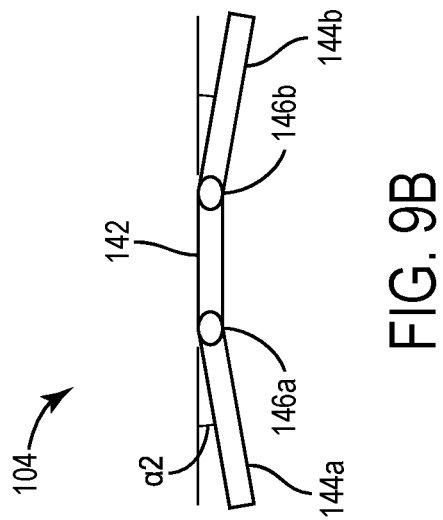
FIG. 9B is a simplified general block diagram illustrating a front view of a header during the downward flex configuration of the harvester shown in FIG. 9A, according to some embodiments.
Figure 9A:
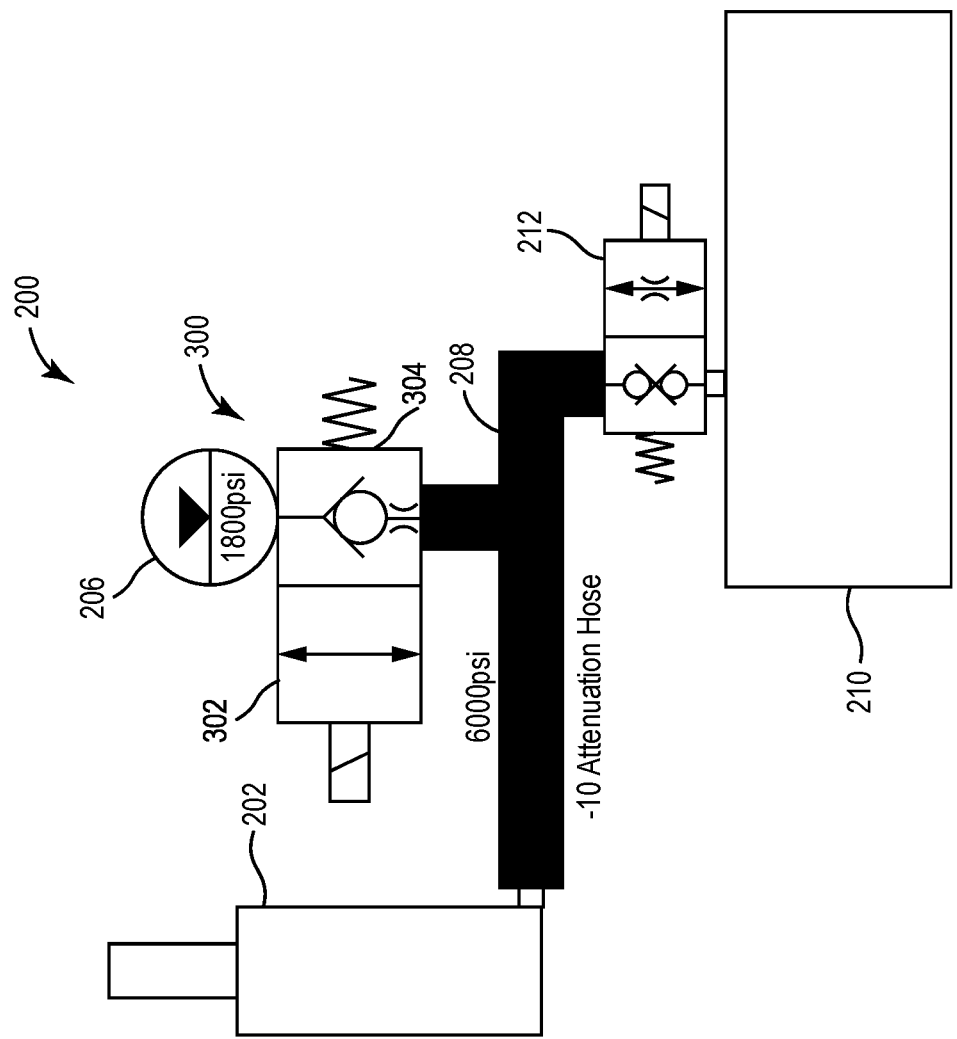
FIG. 9A is a simplified general block diagram illustrating a suspension system during a downward flex configuration of a harvester, according to some embodiments.

Meanwhile, as representatively illustrated by the simplified block diagram of FIG. 9B, the additional decrease in the volume of fluid within the fluid cylinder 202 as fluid is displaced from the fluid cylinder 202 and into the attenuation hose 208 during the downward flex configuration causes the wing 144 to pivot further downwards relative to the center section 142 by an angle of α2. According to various embodiments, the angle α2 may range from approximately 0.05° to approximately 2.0°, more specifically between approximately 0.5° and approximately 1.5°, and even more specifically by approximately 1.0°. As will be understood, the angle α2 by which the left wing 144a is pivoted downwards relative to the center section 142 during the downward flex configuration may be the same or may be different than the angle α2 by which the right wing 144b is pivoted downwards relative to the center section 142 during the downward flex configuration.

As explained with reference to FIG. 8B, although, as shown in FIG. 9B, the wings 144 of the header 104 will exhibit some degree of sagging (i.e. pivoting of the wings 144 downwards relative to the center section 142), with respect to the position of the wings 144 in the configuration immediately prior to the downward flex configuration of the header 104 (such as, e.g., the elevated, non-harvesting transport configuration of FIGS. 8A and 8B), the position of the wings 144 during the downward flex configuration may extend at an upwards angle relative to the center section 142, generally planar with the center section 142, or downwards relative to the center section 142. As will be understood, the angle(s) relative to the center section 142 at which the wings 144 extend during the downward flex configuration will depend on factors such as, e.g., the angle(s) of the wings 144 relative to the center section 142 during the last harvesting configuration of the header 104 prior to the blocker valve 300 being switched to a restricted-flow position; the angle(s) α1 by which the wings 144 are pivoted downwards during the elevated, non-harvesting transport configuration; the angle(s) α2 by which the wings 144 are pivoted downwards during the downward flex configuration; etc.

As illustrated by FIGS. 6A-9B, the ability of the blocker valve 300 to isolate flow into the accumulators 206 during a restricted-flow position and to allow flow to and from the accumulators 206 during a flow position provides the suspension system 200 with first and second variable states defined by varied spring rates, which selectively provide differing degrees of resistance to the movement of the wings 144, and thus allow for differing degrees of pivoting of the wings 144 relative to the center section 142. As discussed with reference to FIGS. 6A and 6B, when the blocker valve 300 is in the flow position, the first variable state (i.e. the harvesting mode) is defined by the hydraulic circuit defined between the fluid cylinder 202, the accumulators 206, and the attenuation hose 208. In this first variable state, the ability of fluid to flow freely between the fluid cylinder 202 and the accumulators 206 provides the hydraulic circuit with a relatively low stiffness, and thus allows the wings 144 to pivot about the center section 142 by an amount that defines a first range of motion. By allowing the wings 144 to pivot about the center section 142, the suspension system 200 enables the wings 144 to dynamically adapt to and follow terrain, which, in addition to increasing crop yield efficiency, also reduces the dynamic loads on the harvester 100 during harvesting operation.

As discussed with reference to FIGS. 7A-9B, when the blocker is in the restricted-flow position, the second variable state (i.e. the transport mode) is defined by the hydraulic circuit defined between the fluid cylinder 202 and the attenuation hose 208. In the second variable state, the expandable nature of the attenuation hose 208 allows the attenuation hose 208 to hold fluid that may flow out of the fluid cylinder 202. This ability of the attenuation hose 208 to hold an increased capacity of fluid provides the suspension system 200 with a manner by which the wings 144 are provided with a second range of motion by which the wings 144 may pivot relative to the center section 142. However, overall, the hydraulic circuit in the transport mode is defined by a greater spring rate than when in the harvesting mode, and accordingly movement of the wings 144 relative to the center section 142 is subject to an increased resistance that results in the movement of the wings 144 being limited to a smaller range of motion than in the first state.

Because the second range of motion is smaller than the first range of motion (such as, e.g., by between approximately 10% and approximately 30%), the ability of the wings 144 to pivot about the center section 142 is more limited when the suspension system 200 is in the second variable state than when the suspension system 200 is in the first variable state. As such, when the header 104 is elevated from the ground with the suspension system 200 in the second variable state (such as, e.g., discussed with reference to the elevated, non-harvesting transport configuration shown in FIGS. 8A and 8B) the suspension system 200 is configured to maintain the header 104 in a relatively level configuration in which the header 104 only exhibits a minimum amount of sagging, thus minimizing the risk of the outermost ends of the wings 144 inadvertently coming into contact with the ground during non-harvesting transport of the harvester 100.

Although the range of motion through which the wings 144 are able to pivot in the second variable state is limited, by providing even a limited range of motion by which the wings 144 are able to pivot about the center section 142, (such as, e.g., by a range of between approximately ±0.05° and approximately ±2.0°) the suspension system 200 is able to reduce the mass of the header 104 that is accelerated during transport of the harvester 100 (such as, e.g., while the harvester is an the elevated, non-harvesting transport configuration), thereby reducing the stress on the structure of the combine 102 (such as, e.g., by at least approximately 5%).

As noted above, the ability of the suspension system 200 to provide the wings 144 with a limited ability to flex while the suspension system 200 is in the second variable state is provided by the ability of the attenuation hose 208 to hold fluid that flows out from the fluid cylinder 202 when the wings 144 are subject to downward forces (such as, e.g., when the header 104 is elevated entirely off of the ground in the elevated, non-harvesting transport configuration or during the downward flex configuration in which the harvester 100 travelling with an elevated header 104 encounters uneven terrain). Accordingly, as will be understood, in various embodiments, the range of motion through which the wings 144 are able to pivot while the suspension system 200 is in the second variable state may be varied by changing any number of variables that would affect the spring constant of the hydraulic circuit in the transport mode, such as, e.g., changing the length of the attenuation hose 208, changing the selection of materials and/or structure of the attenuation hose 208 (to either make the attenuation hose 208 more or less compressible), etc. Additionally, according to some embodiments, the suspension system 200 may optionally be provided with an additional structure via which fluid may be added to and/or removed from the circuit defined by the fluid cylinder 202 and the attenuation hose 208 when the suspension system 200 is in the second variable state.

As will be understood, although the harvesting configuration of FIGS. 6A and 6B, the transition configuration of FIGS. 7A and 7B, the elevated, non-harvesting transport configuration of FIGS. 8A and 8B, and the downward flex configuration of FIGS. 9A and 9B have been described as occurring in a sequential manner, as will be understood, the various configurations illustrated and described with reference to FIGS. 6A-9B may occur according to any other number of sequences, in which any of the configurations may be repeated any number of different times. Additionally, the header 104 may be subject to the configurations of FIGS. 6A-9B for varied durations of time. For example, according to various embodiments, the downward flex configuration of FIGS. 9A and 9B may directly follow the transition configuration of FIGS. 7A and 7B. In some embodiments, the transition configuration of FIGS. 7A and 7B may directly follow the elevated, non-harvesting transport configuration of FIGS. 8A and 8B.

As will also be understood, although the articulated header 104 illustrated herein has been shown as comprising three sections: a center section 142, a left wing 144a, and a right wing 144b, according to other embodiments, the articulated header 104 may comprise any number of different sections, including, e.g., a two section arrangement defined by only the left wing 144a and the right wings 144b.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. References herein to the positions of elements (e.g., "top," "bottom," "above," "below," "upper", "lower", etc.) are merely used to describe the orientation of various elements in the FIGURES. It should be noted that the orientation of various elements may differ according to other exemplary embodiments, and that such variations are intended to be encompassed by the present disclosure.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A harvesting system comprising:
   an articulated header comprising at least a first section and a second section, the first section and second section configured to independently pivot; and
   a suspension system configured to allow the first section and the second section to pivot;
   wherein in a first mode, the suspension system is configured to constrain pivoting of the first section and second section by a first degree in response to the first section and second section being subject to a first force; and
   wherein in a second mode, the suspension system is configured to constrain pivoting movement of the first section and second section by a second degree in response to the first section and second section being subject to a second force that is substantially the same as the first force.

2. The harvesting system of claim 1, wherein the articulated header is configured to move between a first position in which at least a portion of the articulated header is supported along a ground surface and a second position in which the articulated header is elevated entirely off of the ground surface, the suspension system being configured to operate in the first mode when the articulated header is in the first position and to operate in the second mode when the articulated header is in the second position.

3. The harvesting system of claim 2, further comprising a control system having an automatic header height control mode, the suspension system being configured to automatically engage the second mode in response to the header height control mode being deactivated.

4. The harvesting system of claim 2, wherein the suspension system is defined by a first suspension stiffness during the first mode and a second suspension stiffness during the second mode, the second stiffness being different than the first stiffness.

5. The harvesting system of claim 4, the suspension system comprising a first coiled spring and a second coiled spring defined by a greater spring constant than a spring constant defining the first coiled spring, wherein the first coiled spring is engaged in the first mode of the suspension system and the second coiled spring is engaged in the second mode of the suspension system.

6. The harvesting system of claim 4, the suspension system comprising a coiled spring, wherein a length of the coiled spring is greater in the first mode of the suspension system than a length of the coiled spring in the second mode of the suspension system.

7. The harvesting system of claim 4, the suspension system comprising a fluid cylinder fluidly connected to an accumulator and a valve selectively openable to permit flow between the fluid cylinder and the accumulator, wherein in the second mode, the valve is closed to block flow between the fluid cylinder and accumulator.

8. The harvesting system of claim 2, wherein the first section and second section are constrained by the suspension system to a first range of pivoting movement in the first mode and a second range of pivoting movement in the second mode, the second range being smaller than the first range.

9. The harvesting system of claim 1, wherein the articulated header includes a harvesting header comprising the first section and the second section; and
   the suspension system comprising:
      a first fluid cylinder coupled to the first section and a second fluid cylinder coupled to the second section;
      a first attenuation hose and a second attenuation hose;
      a first valve selectively openable to permit flow between the first attenuation hose and a first accumulator; and
      a second valve selectively openable to permit flow between the second attenuation hose and a second accumulator;
   wherein, when the suspension system is operated in the first mode, pivoting movement of each of the first section and second section is subject to a first degree of resistance provided by the suspension system;
   wherein, when the suspension system is operated in the second mode, pivoting movement of each of the first section and second section is subject to a second degree of resistance provided by the suspension system.

10. The harvester system of claim 9, wherein the valve is open during operation of the suspension system in the first mode and is closed during operation of the suspension system in the second mode, wherein the suspension system is defined having a first stiffness in the first mode and a second stiffness, greater than the first stiffness, in the second mode.

11. The harvester system of claim 10, wherein a channel extending through the first attenuation hose and the second attenuation hose defines a first volume in the first mode and defines a second volume greater than the first volume during at least a portion of operation of the suspension system in the second mode.

12. The harvester system of claim 11, wherein a cross-sectional area of the channel is greater during the second mode than a cross-sectional area of the channel during the first mode.

13. The harvester system of claim 10, further comprising a fluid block, wherein the accumulator is fluidly connected to the fluid block during at least the first mode.

14. The harvester system of claim 9, the harvesting head further comprising a center section to which each of the first section and second section are attached, each of the first section and second section independently pivoting relative to the center section.

15. The harvesting system of claim 1 wherein the articulated header includes a harvesting header comprising the first section and the second section; and
the suspension system comprising:
   a first fluid cylinder coupled to the first section and a second fluid cylinder coupled to the second section;
   a first attenuation hose and a second attenuation hose;
   a first valve selectively openable to permit flow between the first attenuation hose and a first accumulator; and
   a second valve selectively openable to permit flow between the second attenuation hose and a second accumulator;
wherein each of the first section and second section are capable of pivoting movement in each of the first mode the second mode, wherein:
the first accumulator is in fluid communication with the first fluid cylinder, and the second accumulator is in fluid communication with the second fluid cylinder;
the first attenuation hose fluidly couples the first fluid cylinder and the first accumulator, and the second attenuation hose fluidly couples the second fluid cylinder and the second accumulator.

16. A method of operating a harvesting header comprising:
   operating a header comprising a left wing and a right wing in a first position, a degree to which the left wing and the right wing pivot upward or downward in response to being subject to a force being constrained to a first operating range when the header is in the first position by a suspension system; and
   operating the header in a second position different than the first position, the degree to which the left wing and the right wing pivot upward or downward in response to being subject to a substantially similar force being constrained to a second operating range by the suspension system when the header is in the second position.

17. The method of claim 16, wherein the second operating range is greater than 0°.

18. The method of claim 16, wherein the first operating range corresponds to a range that extends between approximately 10.0° upwards and approximately 10.0° downwards as measured relative to a center section.

19. The method of claim 16, wherein the second operating range is approximately 20% of the first operating range.

20. The method of claim 16, further comprising a variable spring suspension system configured to selectively constrain the pivoting of the left wing and right wing relative to the center section to either the first operating range or the second operating range, wherein the variable spring suspension is defined by a first stiffness when operating the header in the first position, and a second stiffness that is greater than the first stiffness when operating the header in the second position.

* * * * *